United States Patent [19]

Larson

[11] 4,389,889

[45] Jun. 28, 1983

[54] APPARATUS FOR DETECTING THE PRESENCE OF WATER IN A FUEL TANK

[76] Inventor: Roger G. Larson, 911 Laguna Rd., Fullerton, Calif. 92635

[21] Appl. No.: 239,668

[22] Filed: Mar. 2, 1981

[51] Int. Cl.³ .............................................. G01F 23/26
[52] U.S. Cl. .................................... 73/304 C; 340/59; 340/620
[58] Field of Search ............... 73/304 C; 340/620, 59

[56] References Cited

U.S. PATENT DOCUMENTS

| | | | |
|---|---|---|---|
| 3,950,740 | 4/1976 | Greene | 340/620 X |
| 4,010,650 | 3/1977 | Piatkowski, Jr. | 73/304 C |
| 4,099,167 | 7/1978 | Pomerantz et al. | 73/304 C X |
| 4,112,318 | 9/1978 | Hamelink | 340/620 X |
| 4,201,085 | 5/1980 | Larson | 73/304 C |
| 4,304,132 | 12/1981 | Snaper | 340/620 X |
| 4,316,174 | 2/1982 | Sutton et al. | 340/620 X |

Primary Examiner—Daniel M. Yasich
Attorney, Agent, or Firm—Philip M. Hinderstein

[57] ABSTRACT

Apparatus for determining the fuel level in a fuel tank and for detecting the presence of water in the fuel tank. The fuel level in the tank is determined by detecting the change in capacitance between a pair of electrodes positioned with a generally vertical orientation so that as the fuel rises in the tank, an increasing area of the plates is adjacent to the fuel. Since the presence of water in fuel is very undesirable, the apparatus also includes means for detecting this water before it can effect engine performance and before it can effect the accuracy of the fuel level indicating circuitry.

12 Claims, 5 Drawing Figures

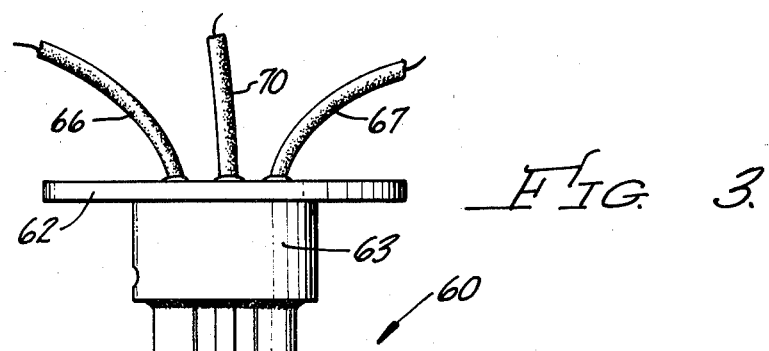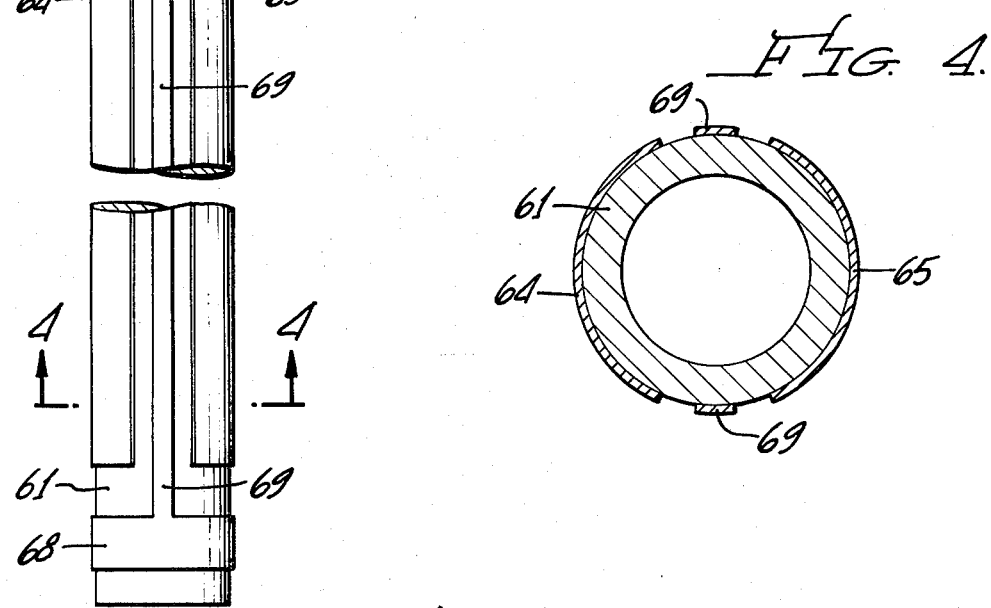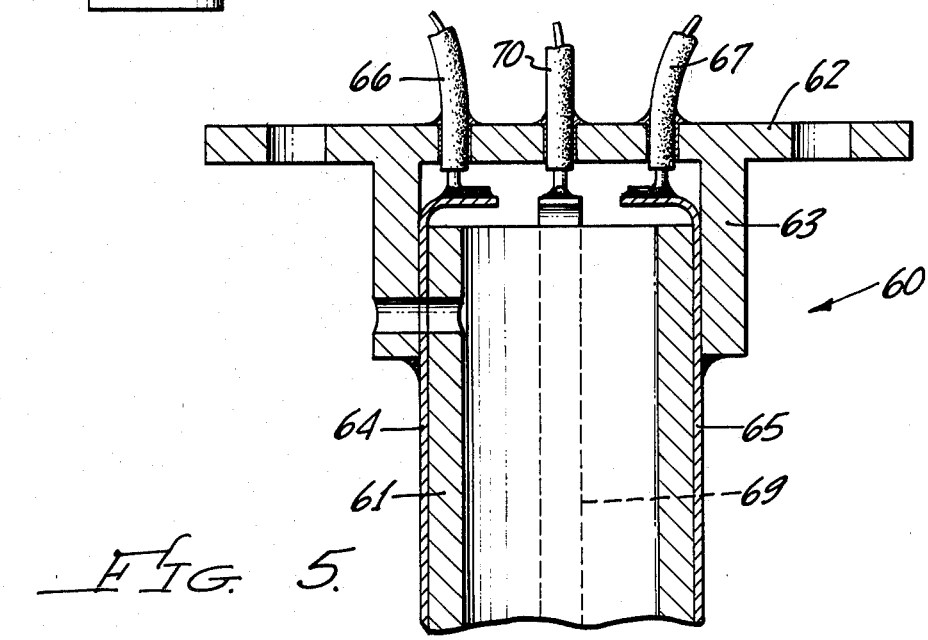

APPARATUS FOR DETECTING THE PRESENCE OF WATER IN A FUEL TANK

BACKGROUND OF THE INVENTION

1. Field of the Invention

The present invention relates to apparatus for detecting the presence of water in a fuel tank and, more particularly, to circuitry for indicating the fuel level in a fuel tank and for simultaneously signaling the presence of water in such fuel tank.

2. Description of the Prior Art

It is well known that water accumulates over a period of time in fuel tanks as a result of condensation, especially in tanks used to store fuel. It is also well known that the presence of water in fuel, especially in diesel fuel, in very undesirable. In the best of cases, the presence of water in fuel will effect engine performance. In the worst of cases, the water will cause the engine to malfunction.

The most common technique used in an attempt to solve the problem of water in fuel is to provide a filter in the fuel line. Unfortunately, such filters have limited capacities and if any significant amount of water is present in the fuel, such capacity will soon be reached, permitting the water to pass with the fuel to the engine.

Since water is heavier than fuel, it will lay on the bottom of a fuel tank. This being the case, it is very common, such as in fuel tanks for airplanes, to provide a sump in the bottom of a tank and to bleed the water from this sump periodically. Unfortunately, none of these techniques are totally satisfactory and they have no capability of signaling the presence of water in a fuel tank.

It is also becoming quite common to use capacitive type fuel gauges to determine the liquid level in a tank. Fuel gauges of this type are described in my prior U.S. Pat. Nos. 4,145,927 and 4,201,085. Such systems include a pair of parallel plates having a generally vertical orientation so that as the liquid rises in the tank, an increasing area of the plates is adjacent to the liquid. The change in capacitance between the plates as a function of liquid level is utilized to generate an electrical signal indicative of liquid level.

While such a system is highly effective, it is also highly sensitive to the presence of water in a fuel tank. That is, diesel fuel and gasoline both have a dielectric constant of about 2, whereas water has a dielectric constant of about 80. Thus, the presence of water in the fuel will significantly effect the capacitance between the plates and will severely effect the liquid level indication. Again, no means has been available heretofore for signaling the presence of water in a fuel tank.

SUMMARY OF THE INVENTION

According to the present invention, these problems are solved by providing apparatus for detecting the presence of water in a fuel tank. Such apparatus is incorporated in a capacitance type fuel measuring system and uses several of the components thereof. According to the preferred embodiment of the invention, an indicator light will be turned on in the presence of any significant amount of water in a fuel tank. Thus, water in a fuel tank may be sensed before it can effect engine performance or cause malfunction thereof and before it can effect the accuracy of the circuitry responsible for indicating fuel level in the tank.

Briefly, the present apparatus for detecting the presence of water in a fuel tank comprises means for generating an AC signal, a first electrode coupled to the AC signal generating means and operatively positioned to couple the AC signal into a fluid in the fuel tank, a second electrode operatively positioned adjacent the bottom of the tank in position to sense the presence of water therein, an operational amplifier and an AC-to-DC converter coupled to the second electrode for providing a DC voltage, the magnitude of which is proportional to the amount of signal coupled between the first and second electrodes, and a level detector and indicator light responsive to the DC voltage for indicating the presence of water in the tank when the voltage exceeds a predetermined voltage. The AC signal generating means and the first electrode are also used as part of a system for determining the fuel level in the tank.

OBJECTS, FEATURES AND ADVANTAGES

It is therefore the object of the present invention to solve the problems associated with the presence of water in a fuel tank. It is a feature of the present invention to solve these problems by a simple and effective method and apparatus for detecting the presence of water in a fuel tank. An advantage to be derived is that water in a fuel tank may be detected before it can effect engine performance. A further advantage is that the presence of water in a fuel tank may be detected before an engine will malfunction. A still further advantage is that the presence of water in a fuel tank will be detected prior to the time that a capacitive type fuel gauge reading will be effected.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 3 is an elevation view of a probe to be used in a metal tank with the circuitry shown in FIG. 1;

FIG. 4 is a sectional view taken along the line 4—4 in FIG. 3; and

FIG. 5 is an enlarged, partial, longitudinal sectional view of the upper portion of the probe of FIG. 3 showing certain details thereof.

DESCRIPTION OF THE PREFERRED EMBODIMENT

Figure 1:
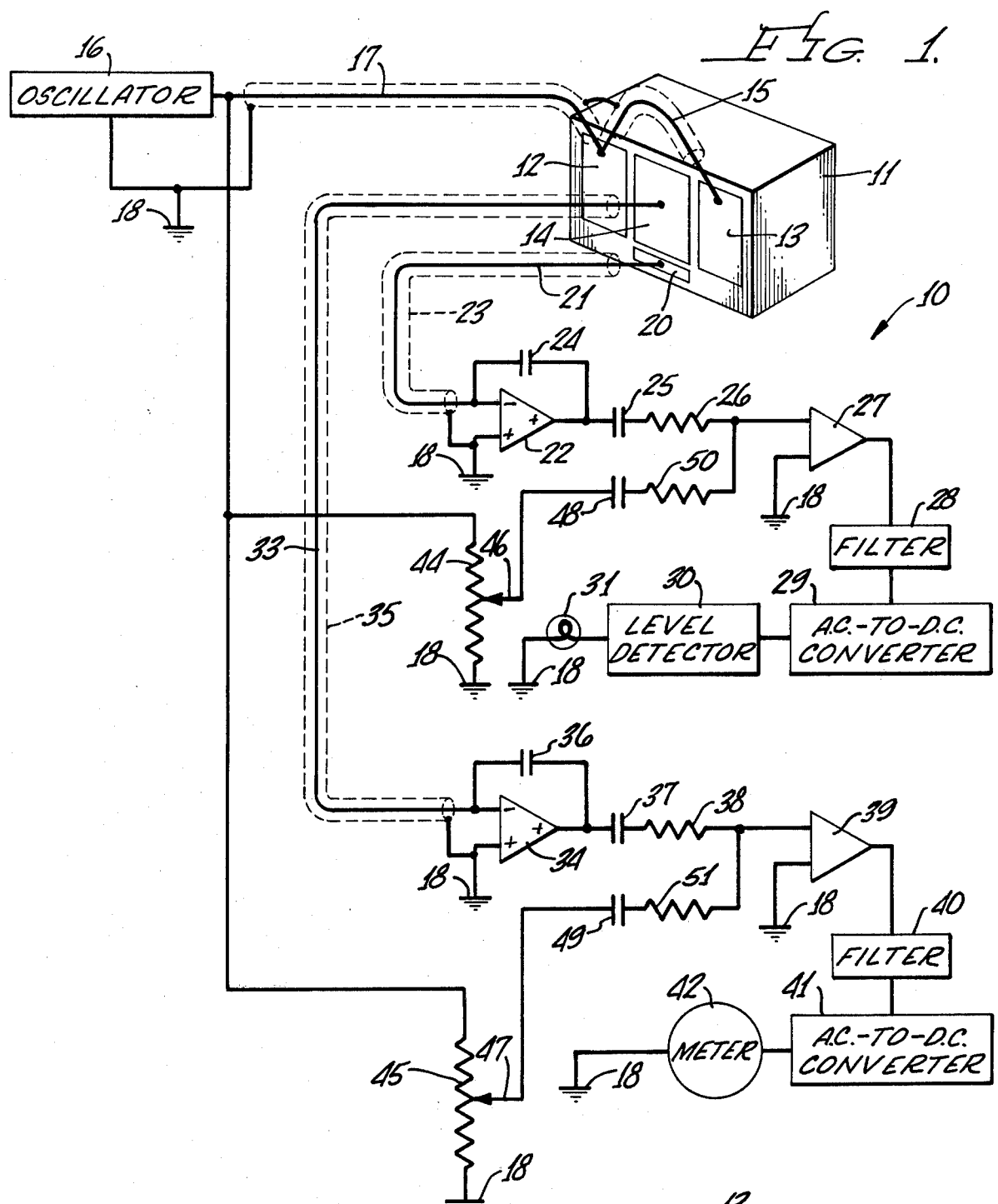
FIG. 1 is a block diagram of a complete system for determining the liquid level in a tank and for detecting the presence of water in such tank.

Referring now to the drawings and, more particularly, to FIG. 1 thereof, there is shown circuit means, generally designated 10, for determining the fuel level in a non-metallic tank 11 and also for detecting and signaling the presence of water in tank 11. As will be described more fully hereinafter, circuit means 10 may be used with the probe of FIGS. 3-5 for performing the same functions with a metal tank.

According to the present invention, and as described more fully in my prior U.S. Pat. Nos. 4,145,927 and 4,201,085, tank 11 has a pair of parallel, spaced, metallic plates 12 and 14 secured to one wall thereof, with a vertical orientation, so that as the fuel rises in tank 11, more and more of plates 12 and 14 are positioned adjacent the liquid. According to the present invention, a third metallic plate 13 is secured to the same wall of tank 11, with plate 14 positioned between plates 12 and 13, plates 12 and 13 being electrically connected by means of a shielded cable 15.

Plates 12 and 13 are used to couple an AC signal from an oscillator 16 into the fluid in tank 11. Oscillator 16 is coupled to plates 12 and 13 by means of a shielded cable 17. Circuit means 10 will function with any one of the plates 12 and 13, but the presence of both plates improves the systems ability to sense the presence of water before the water effects the accuracy of the fuel measurement. It should be noted that the shields of cables 15 and 17 are interconnected and connected to ground 18, together with one of the outputs of oscillator 16.

Plates 12–14 may be attached to any vertical wall of tank 11, even different walls. As is now well known in the art, the capacitance between plates 12 and 13 on the one hand and plate 14 on the other hand will linearly increase as the liquid level in tank 11 increases. This phenomenon may be utilized to provide an output indicative of the liquid level in tank 11.

Figure 2:
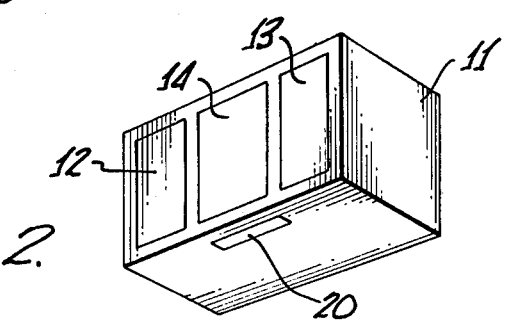
FIG. 2 is a view of a fuel tank showing an alternate location for the water sensing electrode.

Also connected to tank 11 is a fourth electrode 20 which is operatively positioned adjacent the bottom of tank 11. In the embodiment of FIG. 1, plate 20 is secured to the same wall as plates 12–14, below plates 12–14. In the embodiment of FIG. 2, plate 20 is connected to the bottom surface of tank 11. The location of plate 20 shown in FIG. 2 is superior to the location shown in FIG. 1, but such placement is often impossible in the case of tanks already installed in a system.

Plate 20 is connected via a shielded cable 21 to the inverting input terminal of an operational amplifier 22. The non-inverting input terminal of amplifier 22 is connected to ground 18 together with the shield 23 of cable 21. The reason for the use of shielded cables is described more fully in my prior patents. A capacitor 24 is connected between the output of amplifier 22 and the inverting input thereof.

The output of operational amplifier 22 is also connected via a capacitor 25 and a resistor 26 to one input of an amplifier 27, the other input of which is grounded. The output of amplifier 27 is connected via a filter 28, an AC-to-DC converter 29, and a level detector 30 to one terminal of an indicator lamp 31, the other terminal of which is connected to ground 18.

Plate 14 is connected via a shielded cable 33 to the inverting input of a second operational amplifier 34, the non-inverting input thereof being connected to ground 18 together with the shield 35 of cable 33. A capacitor 36 is connected between the output of amplifier 34 and the inverting input thereof.

The output of amplifier 34 is connected via a capacitor 37 and a resistor 38 to one input of an amplifier 39, the other input of which is connected to ground 18. The output of amplifier 39 is connected via a filter 40 and an AC-to-DC converter 41 to one terminal of a meter 42, the other terminal of which is connected to ground 18.

The output of oscillator 16 on lead 17 is also connected to first and second potentiometers 44 and 45 having movable taps 46 and 47, respectively. Taps 46 and 47 are connected via capacitors 48 and 49, respectively, and resistors 50 and 51, respectively, to the inputs of amplifiers 27 and 39, respectively.

In operation, plates 14 and 20 sense the amount of signal coupled through the fluid in tank 11. Plate 14 is used for measuring the fuel level and plate 20 is used to sense the presence of water since water will lay on the bottom of tank 11 and will not mix with diesel fuel or gasoline.

Both diesel fuel and gasoline have dielectric constants (about 2) which are somewhat greater than that of air (close to 1). Water, on the other hand, has a dielectric constant of about 80. The present invention takes advantage of these facts in its operation. That is, when tank 11 is empty, very little signal couples between plates 12–14 and 20. On the other hand, when there is fuel in tank 11, more signal can couple across the fuel and operational amplifier 34 will amplify this signal by the ratio of the capacitance between plates 12 and 13 connected in parallel and plate 14 and the capacitance of capacitor 36. The same applies to the signal at plate 20. As described more fully in my prior patents, the signal output of amplifier 34 will be amplified by amplifier 39 and converted to a DC signal by converter 41 for display by meter 42 which will provide an indication of the liquid level in tank 11.

When water is present in tank 11, it will cover plate 20 before it can reach plate 14 and since its dielectric constant is significantly greater than that of either fuel or air, a much stronger signal will couple through to plate 20 when water is present. This signal is applied via operational amplifier 22 and amplifier 27 to level detector 30. Level detector 30 may be merely a circuit which can be adjusted to provide a signal when a voltage is higher than some preset value. A simple voltage comparator would suffice. The AC signal at the output of operational amplifier 22 is amplified by amplifier 27 and converted to a DC voltage by converter 29. Since the amount of fuel or water in tank 11 is proportional to the amount of AC signal at the output of amplifier 27 and this signal is subsequently converted to a DC voltage, the level of the DC voltage and consequently the amount of water in tank 11 can be determined. The preset value in level detector 30 is set so that indicator light 31 will not light even with a full tank of fuel, but will light when water is present. Even a small amount of water with its substantially higher dielectric constant, will be readily detectable by lamp 31.

It is difficult to say exactly how much water will be necessary to set off lamp 31 because of the different sizes and shapes of tanks in use. However, because water has a dielectric constant which is about 40 times that of either gasoline or diesel fuel, the presence of water in tank 11 will substantially multiply the signal at the output of amplifier 27 and lamp 31 will be lit long before enough water is present to effect the accuracy of the reading of meter 42.

Considering the remainder of the circuit, the use of an operational amplifier for amplifier 22 is quite significant because it forces plate 20 to act as a virtual ground. This being the case, plate 20 acts as a guard plate to prevent signal which is coupled into the water and consequently coupled into plate 20 to also couple into plate 14. This insures that lamp 31 will light to indicate the presence of water well before the accuracy of the fuel reading becomes effected.

Because the dielectric constant of fuel is not very much greater than air, a relatively small signal level is obtained. This makes circuit means 10 somewhat vulnerable to electromagnetic noise generated by nearby electrical equipment, such as DC motors, relay equipment, etc. This situation is overcome by the use of narrow band filters 28 and 40 which will pass the frequency of oscillator 16, but reject noise frequencies. Obviously, there are other more effective filtering techniques, such as auto correlation, using four quadrant multipliers, self tuning filters which track the oscillator frequency, etc. These techniques are more complicated and expensive and are not deemed to be necessary.

Since the signal coupled through fuel in tank 11 is on the same order of magnitude as that coupled through air, there is also a substantial signal present when tank 11 is empty. For proper operation of circuit 10, it is necessary to cancel this signal out. It will be immediately apparent to those skilled in the art that the two operational amplifiers 22 and 34 produce output signals which are identical in wave shape to the output of oscillator 16, except that they are inverted and much smaller in amplitude. The two potentiometers 44 and 45 are driven by the output of oscillator 16 and a variable portion of this signal is summed with the output of amplifiers 22 and 34 at the inputs to amplifiers 27 and 39. Resistors 26, 38, 50 and 51 are summing resistors and capacitors 25, 37, 48 and 49 block any DC signal at the input to amplifiers 27 and 39. Taps 46 and 47 of potentiometers 44 and 45 are adjusted so that the signals thereat when summed when the outputs of amplifiers 22 and 34, respectively, will cancel when tank 11 is empty. Thus, both amplifiers 27 and 39 will only produce signals when a liquid is present in tank 11. Furthermore, this circuitry is completely independent of the shape and frequency of the wave form of oscillator 16.

Amplifiers 27 and 39 further amplify the input signal and drive filters 28 and 40, respectively. The AC signals at the outputs of filters 28 and 40 are converted to DC voltages proportional in amplitude to the AC signals by converters 29 and 41, respectively. In the case of the fuel measurement circuit, the DC signal at the output of converter 41 is applied to a voltmeter 42 which will indicate the fuel level. In the case of the water detector, the DC signal is feed to level detector 30 which can be set, as explained previously, to cause lamp 31 to light when a signal large enough to indicate the presence of water is obtained.

Referring now to FIGS. 3–5, there is shown a probe, generally designated 60, to be used in a metal tank (not shown). Probe 60 includes an elongate, cylindrical, non-metallic tube 61 which is mounted with a vertical orientation, extending down into a tank, from the top thereof. Probe 60 also includes a non-metallic flange 62 which is used to secure probe 60 to the top surface of the tank. Extending downwardly from flange 62 is a hollow boss 63 into which tube 61 is cemented or otherwise secured.

On the outside surface of tube 61 are secured two strips of metallic foil 64 and 65 which are electrically connected to two wires 66 and 67, respectively, which feed through holes in flange 62. Strips 64 and 65 are the two plates of a capacitor, the value of which varies as the fuel in the tank rises or falls. Leads 66 and 67 would be connected to oscillator 16 and amplifier 34 in the circuit of FIG. 1.

An additional electrode 68, consisting of a metal foil ring, is attached to the bottom of tube 61 and two thin strips of foil 69 are connected to ring 68 and to a wire 70 which penetrates flange 62 in a manner similar to wires 66 and 67.

Strips 68 extend upwardly along tube 61, between strips 64 and 65. These narrow strips 69 serve the additional function of reducing the amount of signal coupling between electrodes 64 and 65 when the tank is empty since these strips and the water sensing ring 68 will act as a virtual ground in the same way that the water sensing electrode does in the previously described embodiment. Alternately, ring 68 may be connected to a wire which runs up the center of tube 61 and through flange 62. Electrical lead 70 would be connected to the input of amplifier 22 in the circuit of FIG. 1.

Probe 60 would be mounted in a tank with the bottom of tube 61 just clearing the bottom of the tank or sump. In operation, probe 60 will operate from the circuit shown in FIG. 1 with the electrodes on tube 61 taking the place of the electrodes secured to the outside walls of the tank. Otherwise, the operation is identical.

It will be obvious to those skilled in the art that there are other arrangements for the water sensing electrodes 20 and 68. However, the essence of the present invention is that a water sensing electrode is located below the fuel sensing electrodes such that when water is present, a relatively strong signal will be coupled into this electrode and this signal can be distinguished from the signal which will be due to the fuel alone.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. Apparatus for determining the fuel level in a fuel tank and for detecting the presence of water in the fuel tank before such water can effect the accuracy of the fuel level determination comprising:

means for generating a first AC signal;

a first electrode coupled to said first AC signal generating means and operatively positioned relative to said fuel tank for coupling said first AC signal into a fluid in said fuel tank;

a second electrode positioned in parallel, horizontally-spaced relationship to said first electrode whereby the capacitance between said first and second electrodes increases as the fuel level in said tank increases;

circuit means coupled to said second electrode and responsive to the change in capacitance between said first and second electrodes for providing a second signal indicative of the fuel level in said tank;

a third electrode operatively positioned adjacent the bottom of said tank and positioned to sense the presence of water therein;

means coupled to said third electrode for providing a third signal, a characteristic of which is proportional to the amount of electrical signal coupled between said first and third electrodes; and means responsive to said third signal for indicating the presence of water in said tank when said characteristic of said third signal exceeds a predetermined value.

2. Apparatus according to claim 1, wherein said characteristic of said third signal is the amplitude thereof and wherein said indicating means indicates the presence of water in said tank when the amplitude of said third signal exceeds a predetermined amplitude.

3. Apparatus according to claim 1, wherein said third signal is a voltage and wherein said indicating means indicates the presence of water in said tank when the value of said voltage exceeds a predetermined voltage.

4. Apparatus according to claim 1, further comprising:
   a fourth electrode positioned in parallel, horizontally spaced relationship to said first and second electrodes, said second electrode being positioned between said first and fourth electrodes; and
   means for electrically connecting in parallel said first and fourth electrodes.

5. Apparatus according to claim 1, wherein said third electrode is positioned below said second electrode.

6. Apparatus according to claim 1, wherein said third signal providing means comprises:
   an amplifier.

7. Apparatus according to claim 6, wherein said amplifier is an operational amplifier.

8. Apparatus according to claim 6 or 7, wherein said third signal providing means further comprises:
   an AC-to-DC converter for converting the AC signal output of said amplifier into a DC voltage proportional to the amount of signal coupled between said first and third electrodes.

9. Apparatus according to claim 8, wherein said indicating means comprises:
   level detector means responsive to said converter for generating an output when said DC voltage exceeds a predetermined voltage.

10. Apparatus according to claim 9, wherein said indicating means further comprises:
    a visual indicator responsive to the output of said level detector.

11. Apparatus according to claim 9, further comprising:
    a filter tuned to the frequency of said first AC signal generating means operatively coupled between said amplifier and said AC-to-DC converter.

12. Apparatus according to claim 9, further comprising:
    means responsive to the output of said first AC signal generating means for summing a portion of said first AC signal with the output of said amplifier so that the input to said AC-to-DC converter is zero when said tank is empty.

* * * * *